United States Patent
Moore

[11] Patent Number: 6,000,393
[45] Date of Patent: Dec. 14, 1999

[54] ROOFING SYSTEM

[76] Inventor: Barrie Peter Moore, 25, Prideaux Road, London SW9 9LQ, United Kingdom

[21] Appl. No.: 08/971,651

[22] Filed: Nov. 17, 1997

[51] Int. Cl.$^6$ .................................................. E04D 13/18
[52] U.S. Cl. .......................... 126/621; 126/661; 126/662
[58] Field of Search .................................. 126/621, 623, 126/661, 662

[56] References Cited

U.S. PATENT DOCUMENTS

| | | | |
|---|---|---|---|
| 4,246,892 | 1/1981 | Walche | 126/662 |
| 4,390,010 | 6/1983 | Skillman | 126/621 |
| 4,517,721 | 5/1985 | Graham | 126/661 |
| 4,712,338 | 12/1987 | Trickel | 126/621 |
| 4,738,247 | 4/1988 | Moore . | |

*Primary Examiner*—Carroll B. Dority

[57] ABSTRACT

A system of elements capable of transferring thermal energy from outside to inside a building or vice versa, has abutting waterproof trays (a) enclosing tubes (d) at their junction. Correspondingly long slotted profiles (b) enclosing the joints and held captive by them may be rotated to allow the insertion of rigid elements (c) sequentially so that adjacent pairs of profiles (b) are restrained from further rotational movement and provide a planar surface. Rigid elements (c) of sufficient density may provide a flat roof which is self-ballasting against wind uplift without penetrative fixings to the sub-surface.

8 Claims, 2 Drawing Sheets

ROOFING SYSTEM

FIELD OF THE INVENTION

This invention relates to a roofing system for buildings incorporating a set of elements.

BACKGROUND OF THE INVENTION

Batten-roll and batten-cap metal roofing with lap-joints have been around for centuries. Similarly, patent glazing incorporating metal and glass has been used very successfully on buildings for many years but unjointed examples are restricted by the length of the glass panes. In contrast, standing seem continuous tray roofing is comparatively new. It is becoming increasingly common, however, because of its secret clip-fixing which does not penetrate the external coverings. The slope necessary to drain these designs has been reduced to a few degrees but there are a few examples of this technology which are true pedestrian areas. In order to ensure water tightness it has hitherto been necessary to incorporate continuous impervious membranes in roofs with shallow falls. This usually precludes the design from being vapor permeable without special detailing for this, and thermal expansion. Such membranes are usually materials which do not conduct thermal energy efficiently and are consequently poor candidates for collecting solar energy.

SUMMARY OF THE INVENTION

According to the present invention there is provided a system of elements adapted to accommodate plumbing to collect or dissipate thermal energy, containing: rigid elements shaped to complete abutments with hereafter-described profiles, captive tubular elements, trays with semi-cylindrical indentations in their upstands/downstands and, correspondingly long hollow-section waterproof profiles incorporating an aperture along their length. An assembly allows pivoting of the profiles while they hold the captive tubular elements within their void in thermal contact with the semi-cylindrical indentations formed in the trays. The assembly is keyed together when shaped rigid elements are inserted to complete a planar surface by abutments with adjacent profiles.

BRIEF DESCRIPTION OF THE DRAWINGS

Specific embodiments of the invention will now be described by way of examples with reference to the accompanying drawings.

REFERENCE LISTING

The drawings depict the following elements which have common annotation in both figures:

a) A set of long trays with half-round indentations in the upstands/downstands.

b) A set of similarly long profiles with the cross-sectional form of a truncated pyramid or dove-tail having a substantially continuous aperture to allow two thicknesses of the trays (a) to be inserted into the void of the section.

c) A set of rigid elements shaped to form an abutment between adjacent profiles (b) and depending on the orientation of elements (a) and (b), positioned either in, or under the trays.

d) A set of tubular elements consisting of extrusions, pipes, tubes, hoses or heat pipes singly or in combination at the conjunction of two trays (a).

e) A set of permanent of loose attachments to any element (d) to facilitate fixing other components.

f) A set of plastics distancing strips/units.

g) A thermally conducting liquid or paste preferably non-setting.

h) A set of gaskets.

j) A set of fixing straps.

DETAILED DESCRIPTION OF THE INVENTION

The trays (a) are impervious to water and channel rain to their extremities. The dove-tail profiles (b) are also impervious to water and provide a weatherproof cap or internal collection channel to pairs of abutting trays (a). The trays (a) are held along the length of the aperture in the dove-tail profiles (b), by a captive element (d) which is engaged by the semi-cylindrical indentations in the trays (a). The rigid elements (c) prevent rotation of the dove-tail profiles (b) and key the assembly together to give substantially flat surface to the top or bottom (depending on orientation) of the whole system of elements. Thermal expansion is catered for by allowing the elements to slide relative to each other in their length. In the other direction, the shortness of the dimension coupled with regular jointing accommodates any minor expansion. Vapor permeability is ensured by not sealing joints and allowing condensate to drain to the outside of the building along the line of the dove-tail profiles (b). Solar energy is transferred via the trays (a) to the extrusions, tubes, pipes, hoses or heat pipes (d) having passed through rigid elements (c) where these elements are on the outside.

Dissimilar materials are separated by a set of plastics distancing strips/units (f) providing thermal breaks and avoiding abrasion or electrolytic action. The assembly is held down by its weight or optional straps (j) that are fixed to the structure on the underside. Alternatively, especially with an external structure, the fixing is via a set of permanent or loose attachments (e) to any element (d).

Figure 1:
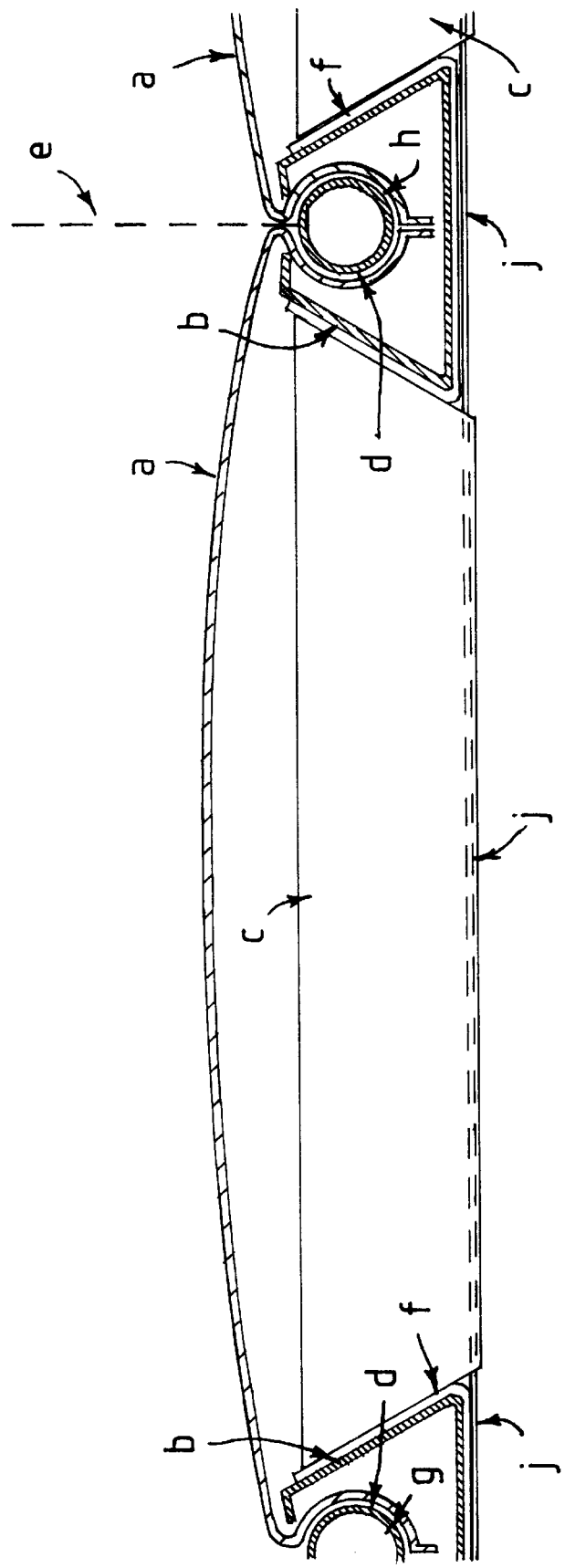
FIG. 1 shows a section through a preferred pitched roof application.

With reference to FIG. 1 in the drawings, a substantial amount of pre-assembly is possible in an embodiment incorporating metal components. Metal straps (j) incorporate holes at modular intervals through which screws may be driven to attach the element to the structure. Prior to attachment, rigid elements (c), formed from metal tubes or channels, are threaded onto the straps and located between fixing holes. A series of these rigid elements (c) may then be attached to the structure with the strap (j) acting as a hold down mechanism. Shims of an appropriate thickness are located at the fixing holes allowing the rigid elements (c) to slide along the strap (j).

All of the straps (j) and rigid elements (c) may be attached to the structure and aligned before final fixing.

The trays (a), profiles (b) and tubular elements (d), as a separate sub-assembly, may be brought to site as a coil not unlike a roller shutter. The dove-tail profiles (b) can be located in the spaces between adjacent rigid elements (c), after which the metal tubes or channels can be slid sideways on the strap (j) to key the elements together. Final tightening of fixings may be carried out after all elements have been located to their permanent positions.

A sub-assembly of elements (a) (b) and (d) is not essential and a different procedure can be used to advantage. In an embodiment where element (b) is a roll-formed metal channel, tubular elements (d) are located into the semi-cylindrical indentations of adjacent trays (a) and pressed down into the continuous aperture of the dove-tail element (b), already in position between adjacent rigid elements (c). A zipping effect is achieved as the walls of the dove-tail element (b) are forced apart to complete the sub-assembly. The metal tubes or channels (c) are slid sideways to prevent unzipping and the keyed-together elements are located in their permanent positions with the final tightening.

Figure 2:
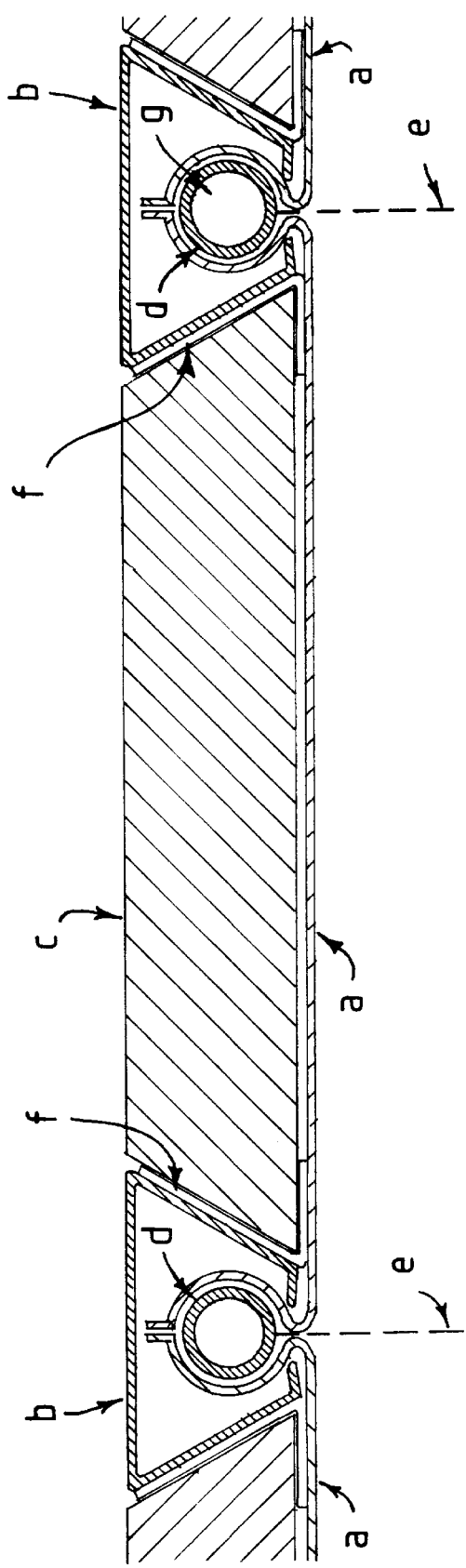
FIG. 2 shows a section through a preferred flat roof application.

With reference to FIG. 2 on the drawings, where elements are fully supported, the trays (a) may be laid directly on this support. Dove-tail profiles (b) can then be slid along adjacent abutments of the trays (a) to enclose the semi-cylindrical indentations. Tubular element (d) can be located in a similar manner by raising the previously assembled elements (2 of (a) and one of (b)) and causing the semi-cylindrical indentations to open like a pair of jaws. When the full length of tubular element (d) is in position, the sub-assembly can be dropped back on its support. Element (d) is now held captive and the operation can be repeated on consecutive elements of this sub-assembly. Rigid element (c) is placed to fill the gap between pairs of dove-tail profiles (b), each successive one of which is pivoted to one side to allow insertion of the rigid elements (c). This operation keys all the elements together to provide a planar surface to the roof. Plastics distancing strips/units (f) are inserted during or prior to this operation.

The manufacture of the trays (a) and dove-tail profiles (b) can allow single, unjointed elements to run the whole length of the roof thus ensuring weatherproofness. Thermal expansion and vapor permeability are built in to the design which can thereby also accommodate plumbing to collect or dissipate thermal energy. A flat roof can be designed which is self-ballasting against wind uplift and need not incorporate any nail holes or penetrative fixings whatsoever. Where penetrative fixings are used, they can be aligned horizontally and vertically before the roof coverings are attached. With preassembly and mechanical handling, rapid installations are possible. The scale and visual appearance can be varied by adopting a variety of modular components, any of which can be made to resemble existing roofing materials.

A vast range of different materials can be employed to give designs particular benefits. Varieties must may heed to mutual compatibility since a concrete rigid element (c) would not be compatible with e.g. an aluminum element (a) or (b), and while it would be compatible with plastics materials (such as extruded PVC, polycarbonate sheet, pultruded or other forms of glass fiber etc.) These would not give good solar-collecting properties.

Solid glass blocks as rigid elements (c) in conjunction with metal trays would give good thermal collecting properties but fired clay bricks would allow controlled thermal dissipation as well as collection according to choice, plus better wet slip-resistance for any pedestrian traffic. In the case of choosing a suitable rigid element (c), a hollow glass block, particularly if enclosing a partial vacuum, would have excellent one-way thermal transmission capabilities but poor heat rejecting properties for cooling should this be required. Foamed plastics such as polystyrene or polyurethane would also act as insulants but have the advantage of lighter weight than glass. Laminated sheets combining friable with more durable materials for external properties can be designed as rigid elements (c), and give appropriate fire resistance in combination with any specification of insulating, decorative or other requirements. A combination of aerated or foamed materials such as glass, concrete, clay or plastics, offer the benefits of insulation and light weight when combined with metals or glass fiber in a laminated format. Many such suitable combinations are known.

What is claimed is:

1. A roofing system, comprising:

a plurality of profiles having a length, an aperture along their length, a tray, said tray having a top portion and extensions extending from said top portion, said extensions having semi-cylindrical indentations along their length, said extensions extending into said profile through said profile aperture, abutting trays having cooperating semi-cylindrical indentations to form cylindrical passages, and tubular elements retained in said cylindrical passages.

2. The roofing system of claim 1, wherein said profiles are trapezoidal shaped.

3. The roofing system of claim 2, wherein said profile aperture is in the short base of said trapezoidal shape of said profile.

4. The roofing system of claim 1, wherein said tray extensions extend downward from said tray top portion.

5. The roofing system of claim 1, wherein said tray extensions extend upward from said tray top portion.

6. The roofing system of claim 1, further comprising a rigid element extending between adjacent profiles.

7. The roofing system of claim 6, further comprising an insulating material between said rigid element and said profiles.

8. The roofing system of claim 6, further comprising a fixing strap threaded through said rigid element for securing said rigid element to a support.

* * * * *